(12) United States Patent
Otsuji et al.

(10) Patent No.: US 6,796,346 B2
(45) Date of Patent: Sep. 28, 2004

(54) BIAS TIRE WITH SPECIFIED TREAD RUBBER LOSS TANGENT

(75) Inventors: Hideki Otsuji, Kobe (JP); Kazumi Yamazaki, Kobe (JP); Touru Fukumoto, Kobe (JP); Norikatsu Nakata, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 252 days.

(21) Appl. No.: 10/214,190

(22) Filed: Aug. 8, 2002

(65) Prior Publication Data

US 2003/0094228 A1 May 22, 2003

(51) Int. Cl.⁷ ............... B60C 11/00; B60C 9/06; B60C 3/04
(52) U.S. Cl. ........ 152/209.1; 152/454; 152/548; 152/556; 152/557; 152/559
(58) Field of Search .............. 152/209.1, 454, 152/548, 556, 557, 559

(56) References Cited

U.S. PATENT DOCUMENTS 3,929,180 A  * 12/1975  Kawase et al. ............ 152/556
3,989,083 A  * 11/1976  Chrobak ................... 152/556
4,209,050 A     6/1980  Yoshida et al.
4,945,964 A     8/1990  Takiguchi et al.

FOREIGN PATENT DOCUMENTS

EP   0 908 329 A2   4/1999
JP   62026101 A   *  2/1987   ............ 152/548
JP   07097485 A   *  4/1995

OTHER PUBLICATIONS

Patent Abstracts of Japan, vol. 2000, No. 14, JP 2001–309205 A (Yokohama Rubber Co Ltd), Nov. 7, 2000.

* cited by examiner

Primary Examiner—Adrienne C. Johnstone
(74) Attorney, Agent, or Firm—Birch, Stewart, Kolasch & Birch, LLP

(57) ABSTRACT

A bias tire comprises a tread portion, a pair of sidewall portions, a pair of bead portions each with a bead core therein, a carcass extending between the bead portions and comprising two cross plies of cords, and a tread rubber disposed radially outside a crown portion of the carcass to define a tread face, wherein the loss tangent of the tread rubber is in a range of 0.40 to 0.60 under a temperature of 50 deg.C., the distance between the tread rubber and the adjacent cords of the radially outermost carcass ply is at most 1.0 mm, and the two cross plies include at least one ply of PEN cords made of polyethylene 2,6 naphthalate fibers twisted together.

6 Claims, 2 Drawing Sheets

BIAS TIRE WITH SPECIFIED TREAD RUBBER LOSS TANGENT

BACKGROUND OF THE INVENTION

The present invention relates to a pneumatic tire, more particularly to a bias ply tire with an improved inner tread structure which is suitable for racing karts.

BRIEF SUMMARY OF THE INVENTION

Karting is one of the fastest growing forms of motor sport in the world. In recent years, the maximum running speed reaches over 100 kilometer/hr and the running distance in a race becomes increased. The kart tires, which have a low aspect ratio of not more than 0.5 and a very small diameter of not more than 300 mm, are required to have not only excellent high-speed performance such as maneuverability (grip), acceleration (traction) and the like but also long life being capable of maintaining the excellent performance in order to shorten lap time.

It is therefore, an object of the present invention to provide a bias tire, in which maneuverability, acceleration and the like are improved and endure long time in spite of high-hysteresis soft tread rubber compound, and thereby being possible to shorten lap time.

According to the present invention, a bias tire comprises a tread portion, a pair of sidewall portions, a pair of bead portions each with a bead core therein, a carcass extending between the bead portions and comprising two cross plies of cords, and a tread rubber disposed radially outside a crown portion of the carcass to define a tread face, wherein the loss tangent of the tread rubber is in a range of 0.40 to 0.60 under a temperature of 50 deg.C., the distance between the tread rubber and the adjacent cords of the radially outermost carcass ply is at most 1.0 mm, and the above-mentioned two cross plies include at least one ply of PEN cords made of polyethylene 2,6 naphthalate fibers twisted together.

BRIEF DESCRIPTION OF THE DRAWINGS

Embodiments of the present invention will now be described in detail in conjunction with the accompanying drawings.

DETAILED DESCRITPION OF THE INVENTION

Figure 1:
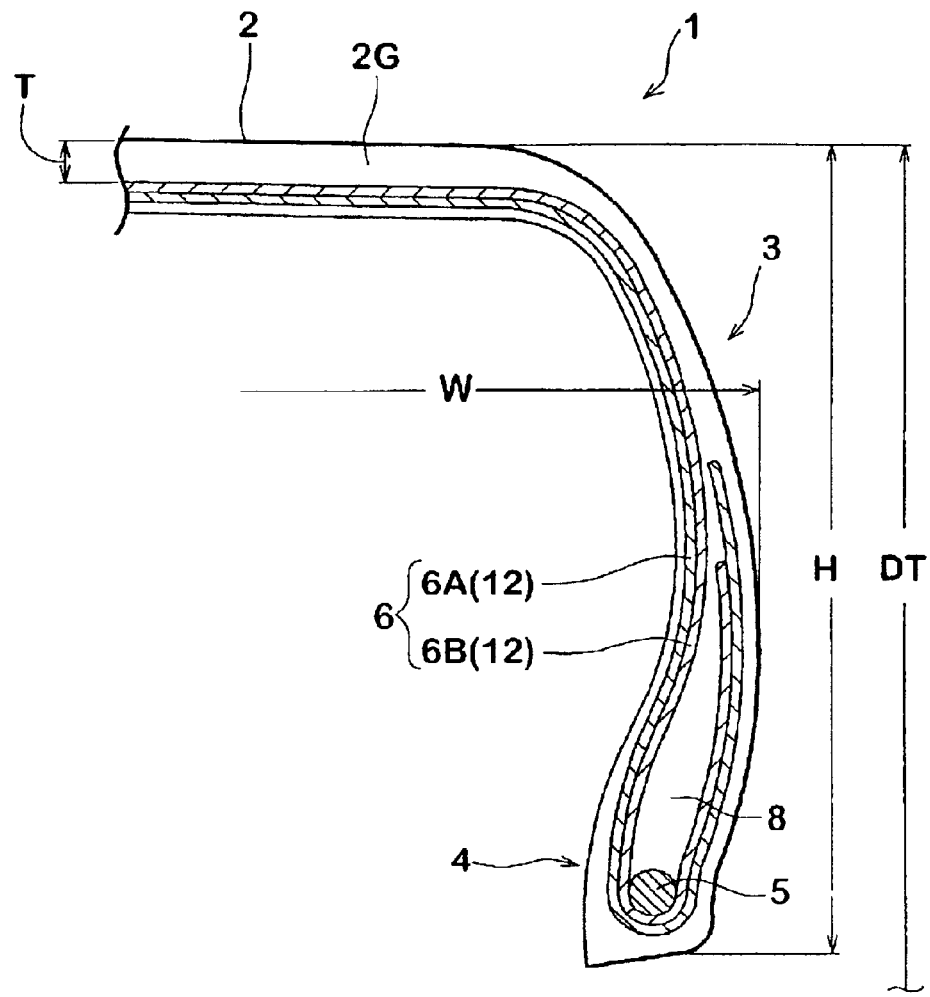
FIG. 1 is a cross sectional view of an embodiment of the present invention.

In the drawings, bias tire 1 according to the present invention comprises a tread portion 2, a pair of sidewall portions 3, a pair of bead portions 4 each with a bead core 5 therein, and a carcass 6 extending between the bead portions 4. The bias tire 1 is a low-aspect racing slick tire for racing karts having an overall diameter DT of not more than 300 mm and an aspect ratio (height H/width w) of not more than 0.5.

A tread rubber 2G is disposed directly on the radially outside of the crown portion of the carcass 6, namely, a tread reinforcing belt such as breaker and band is not provided on the radially outside of the carcass 6.

The tread rubber 2G is made of a racing compound and the loss tangent (tan delta) thereof is in a range of 0.40 to 0.60. Thus, the hysteresis loss is relatively great. As a result, there is a possibility that the temperature of the tread rubber reaches over 100 deg.C. during high speed running, and accordingly, the carcass cords are heated up to almost the same temperature. Further, the hardness thereof is set in a range of from 35 to 70 degrees, preferably 40 to 55 degrees. In order to prevent heat build up and resultant failure in the tread portion, relatively thin rubber is used as the tread rubber 2G, and the thickness T thereof is set in a range of from 3.0 to 5.0 mm at the tire equator C. The thickness T is almost constant across the overall tread width if the thickness T is less than 3.0 mm and/or the hardness is less than 40 degrees, it becomes impossible to obtain necessary wear life. If the loss tangent (tan delta) is less than 0.40, the grip performance becomes insufficient for racing kart use. If the loss tangent (tan delta) is more than 0.60, as the heat generation greatly increases, blowout is liable to occur. Here, the rubber hardness means the durometer type-A hardness measured according to Japanese Industrial standard JIS-K6253 at a temperature of 23 deg.C. The loss tangent (tan delta) is measured with a viscoelastic spectrometer made by IWAMOTO SEISAKUSYO under the following conditions: initial elongation 10%, amplitude of dynamic strain +/−1%, frequency 10Hz, temperature 50 deg.C.

The carcass 6 comprise two cross plies 6A and 6B of cords 10 rubberized with topping rubber 11. In each of the cross plies 6A and 6B, the cords 10 are arranged at a certain angle in the range of from 25 to 38 degrees with respect to the tire equator. The cord angle of the inner ply 6A is numerically substantially the same as the cord angle of the outer ply 6B. But, directionally they are opposite to each other, namely, their inclinations are opposite with respect to the tire equator. Each ply 6A, 6B extends between the bead portions 4 through the tread portion 2 and sidewall portions 3, and is turned up around the bead core 5 in each bead portion 4 from the inside to the outside of the tire to form a pair of turnup portions and a main portion therebetween. The bead portions 4 are each provided between the carcass turnup portion and main portion with a bead apex rubber 8. The bead apex rubber 8 extends radially outwardly from the bead core 5 into the sidewall portion 3 in order to provide rigidity to the bead portion 4 and to reinforce a sidewall lower portion. The axially inner turnup portion extends to about 50% of the tire section height H. The axially outer turnup portion extends over 50% of the tire section height H, beyond the radially outer end of the bead apex rubber 8.

According to the present invention, the carcass 6 includes at least one ply 12 of polyethylene 2,6 naphthalate (PEN) fiber cords 10A.

The thickness D of the PEN fiber cord 10A is set in a range of from 500 to 2500 dtex. As for the cord structure, preferably employed is a regular lay structure wherein the PEN fibers are twisted in a first direction into a strand (strand twist), and two strands are twisted in the opposite direction into a cord (cord twist). The strand twist and cord twist are preferably set in a range of from 30 to 60 turn/10 cm.

Preferably, an intermediate elongation percentage of the PEN fiber cord 10A at a load of 66 N is set in a range of from 2.0 to 4.0%. Here, the intermediate elongation percentage is measured under a temperature of 20 deg.C. and a humidity of 65%.

As to the density of the PEN fiber cords 10A in the PEN cord ply 12, the cord count N is set in a range of from 35 to 90/5 cm, and in case of racing karts, it is preferable that the product DXN of the cord thickness D in dtex and the cord count N (/5 cm) is set in a range of from 75000 to 90000.

The following table 1 shows characteristic of a PEN fiber cord, PET fiber cord and aramid fiber cord.

TABLE 1

| Cord | PEN | | PET | | aramid | |
| --- | --- | --- | --- | --- | --- | --- |
| Thickness (dtex) | 1670 | | 1670 | | 1670 | |
| Temperature (deg. C.) | 25 | 100 | 25 | 100 | 25 | 100 |
| Elastic modulus (kN) | 1.8 | 1.6 | 1.5 | 1.2 | 2.0 | 1.9 |
| Energy loss (tan delta) | 0.05 | 0.05 | 0.02 | 0.03 | 0.1 | 0.1 |

*cord structure: a regular lay structure of two strands.

In the PET fiber cord, the energy loss (tan delta) is desirably very small, thereby being possible to improve the rolling resistance and acceleration performance. However, the elastic modulus varies widely as the temperature changes when the temperature increases from 25 deg.C. to 100 deg,C., the elastic modulus decreases about 20%. Therefore, there is a possibility that the maneuverability deteriorates during high speed running.

In the aramid fiber cord, the elastic modulus is high and the elastic modulus variation is desirably small. But, the energy loss is relatively great, which is not desirable for acceleration performance.

In case of the PEN fiber cord, the elastic modulus is higher than the PET fiber cord and a value near the aramid fiber cord is displayed at room temperature. Further, the elastic modulus variation due to temperature change is desirably small and the energy loss (tan delta) is also small.

Thus, the PEN fiber cord has advantageous characteristics of the PET fiber cord and aramid fiber cord. As a result, it becomes possible to use the above-mentioned high-hysteresis racing compound for the tread rubber 2G without lowering the rigidity, and not only road grip performance but also high-speed maneuverability can be improved.

If the cord thickness D is less than 500 dtex, bending rigidity of the tread portion becomes insufficient to provide a stable ground contacting face. If the cord thickness D is more than 2500 dtex, the bending rigidity becomes excessively high and the ground contacting area decreases.

If the twist number is less than 30 turn/10 cm, the fatigue resistance decreases and cord failure is liable to occur. If the twist number is more than 60 turn/10 cm, the elongation percentage of the cord increases and it becomes difficult to provide sufficient rigidity for high speed running.

If the intermediate elongation percentage is less than 2.0%, as the carcass is of a bias structure, there is a tendency for the carcass to cause a partial deformation. If the intermediate elongation percentage is more than 4.0%, it becomes difficult to take advantage of the PEN cords' characteristics, and as a result, it is difficult to achieve the object of the present invention.

Figure 2:
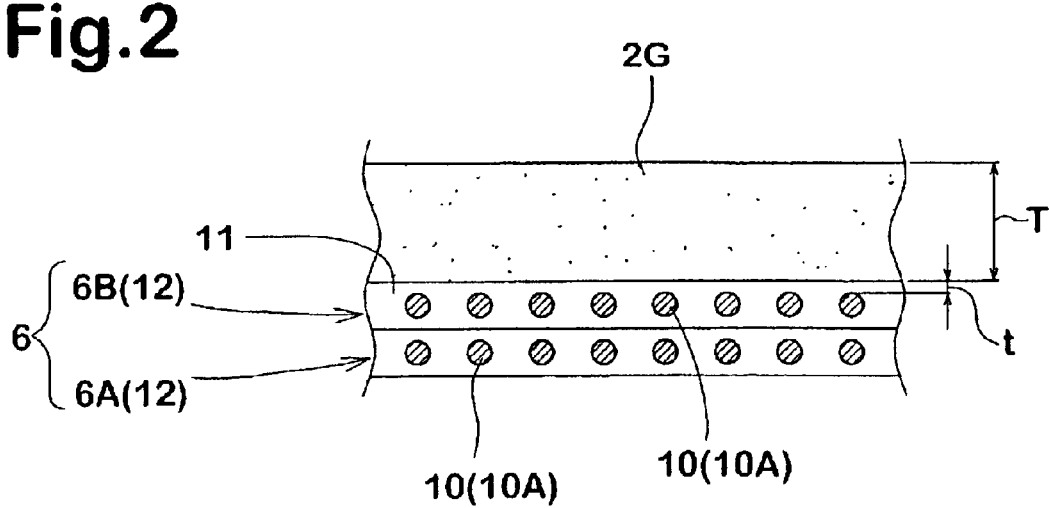
FIG. 2 is an enlarged cross sectional view of the tread portion thereof.

In the embodiment shown in FIGS. 1 and 2, the carcass 6 consists of the two cross plies 6A and 6B, and both of the plies 6A and 6B are the PEN cord ply 12.

Figure 3:
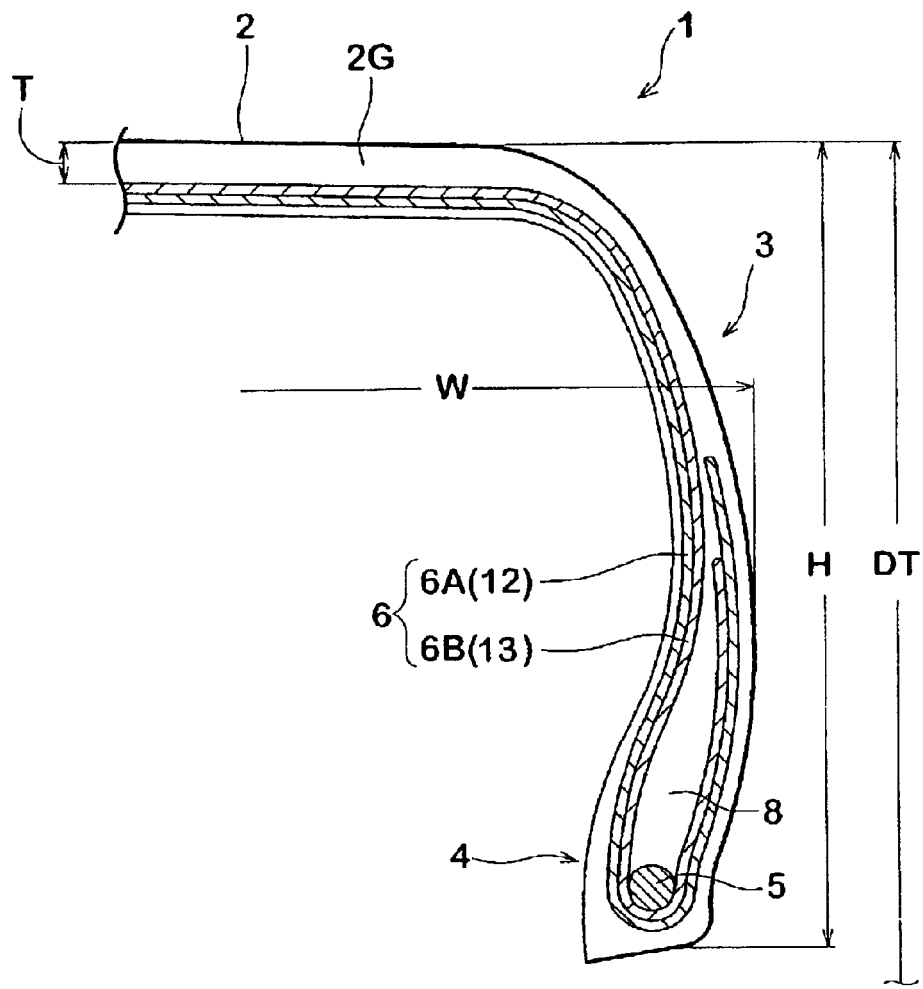
FIG. 3 is a cross sectional view of another embodiment of the present invention.
Figure 4:
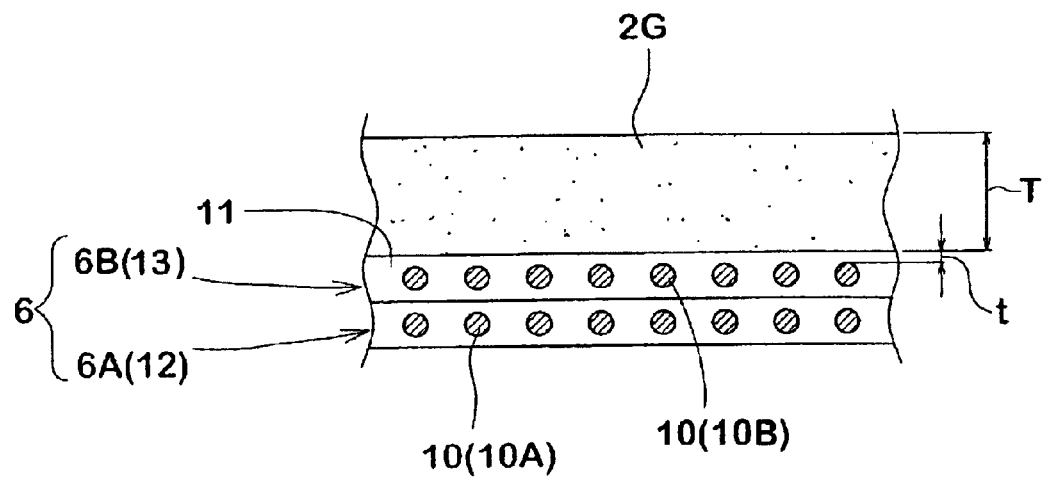
FIG. 4 is an enlarged cross sectional view of the tread portion thereof.

In another embodiment shown in FIGS. 3 and 4, the carcass 6 consists of the two cross plies 6A and 6B, wherein the inner ply 6A is the PEN cord ply 12 but the outer ply 6B is a aramid cord ply 13 made of aramid fiber cords 10B. AS the inner ply 6A is subjected to compressive stress more than the outer ply 6B, the PEN fiber cords 10A being relatively strong against such stress are used. Meanwhile, as the outer ply 6B is subjected to tensile stress more than the inner ply 6A, the aramid fiber cords 10B being very strong against tensile stress are used. Therefore, high-speed maneuverability may be further improved by the aramid cord ply 13 while traction performance is improved by the PEN cord ply 12.

In any case, the hardness of the topping rubber 11 for the carcass cords 10 (10A, 10B) is set in a range of from 50 to 70 degrees, preferably 55 to 65 degrees, namely, the rubber is relatively soft in comparison with those in pneumatic tires under other categories. Further, it is preferable that the hardness of the topping rubber 11 is more than that of the tread rubber 2G in order to prevent separation of the tread rubber 2G and the PEN cord ply. As shown in FIG. 2 and FIG. 4, the covering thickness (t) of the topping rubber 11 over the outmost carcass cords 10 (10A, 10B) is set in a range of not more than 1.0 mm. Accordingly, the distance between the tread rubber 2G and the outmost carcass cords 10 is at most 1.0 mm. The covering thickness (t) is usually in a range of 0.2 to 0.5 mm.

As described above, the tread rubber 2G is very thin and relatively soft. Accordingly, the characteristics of the carcass cords and carcass plies affect tire performance not a little. By constructing the carcass as above, tire performance such as grip, traction, maneuverability and the like can be effectively improved, and at the same time the duration can be increased.

Comparison Tests

Bias tires for racing karts having the structure shown in FIG. 1 were made and comparison tests were conducted.

In the tests, a racing kart provided with test tires (front tire size:10×4.50–5, rear tire size: 11×7.10–5) was run ten laps in a racing circuit of 1050 meters overall, and the lap time was measured. In Table 2, the average lap time of the second and third laps and the average lap time of the ninth and tenth laps are shown. Further, the grip performance (maneuverability), traction performance (acceleration) and keeping-up of the performance (performance change) were evaluated into five ranks by the driver's feeling, wherein the larger the rank number, the better the performance.

TABLE 2

| Tire | Ex. | Ref. 1 | Ref. 2 |
| --- | --- | --- | --- |
| Outer carcass ply Cord material | PEN | Aramid | PET |
| Inner carcass ply Cord material | PEN | Aramid | PET |
| Test Results | | | |
| Average lap time | | | |
| 2nd lap & 3rd lap | 49"52 | 49"80 | 50"12 |
| 9th lap & 10th lap | 49"69 | 49"94 | 50"55 |
| Lap time change | +0"17 | +0"14 | +0"43 |
| Grip | 4.0 | 3.5 | 2.8 |
| Traction | 4.0 | 3.5 | 3.0 |
| Performance change | 3.9 | 4.0 | 2.5 |

TABLE 3

| | Common specifications | |
| --- | --- | --- |
| Tire | Front | Rear |
| Tire size | 10 × 4.50 – 5 | 11 × 7.10 – 5 |
| Tread rubber | | |
| Thickness T (mm) | 4.5 | 4.5 |
| Hardness (deg.) | 52 | 52 |
| Loss tangent | 0.51 | 0.51 |

TABLE 3-continued

Common specifications

| Tire | Front | Rear |
|---|---|---|
| Carcass | | |
| Ply number | 2 | 2 |
| Outer ply | | |
| Cord angle (deg.) | −30 | −30 |
| Cord conunt N/5 cm | 50 | 50 |
| Topping rubber hardness (deg.) | 60 | 60 |
| Covering thickness t (mm) | 0.3 | 0.3 |
| Cord thickness (dtex) | 1650 | 1650 |
| Cord/strand twist (turn/10 cm) | 40/40 | 40/40 |
| Inner ply | | |
| Cord angle (deg.) | +30 | +30 |
| Cord conunt N/5 cm | 50 | 50 |
| Topping rubber hardness (deg.) | 60 | 60 |
| Cord thickness (dtex) | 1650 | 1650 |
| Cord/strand twist (turn/10 cm) | 40/40 | 40/40 |

What is claimed is:

1. A bias tire comprising
a tread portion,
a pair of sidewall portions,
a pair of bead portions each with a bead core therein,
a carcass extending between the bead portions and comprising two cross plies of cords,
a tread rubber disposed radially outside a crown portion of the carcass to define a tread face,
the loss tangent of the tread rubber being in a range of 0.40 to 0.60 under a temperature of 50 deg.C.,
the distance between the tread rubber and the adjacent cords of the radially outermost carcass ply being at most 1.0 mm, and
said two cross plies including at least one ply of PEN cords made of polyethylene 2,6 naphthalate fibers twisted together.

2. A bias tire according to claim 1, wherein
the thickness T of the tread rubber is in a range of from 3.0 to 5.0 mm.

3. A bias tire according to claim 1, wherein
said at least one ply is two plies.

4. A bias tire according to claim 1, wherein
said at least one ply is one ply, and
the other one of said two cross plies is a ply of aramid cords made of aromatic polyamide fibers twisted together.

5. A bias tire according to claim 1, wherein
a tread reinforcing cord layer is not provided between the tread face and the carcass.

6. A bias tire according to claim 1, wherein
the diameter of the tire is not more than 300 mm and the aspect ratio of the tire is not more than 0.5.

* * * * *